US010983823B2

(12) United States Patent
Sato et al.

(10) Patent No.: US 10,983,823 B2
(45) Date of Patent: Apr. 20, 2021

(54) COMPUTER APPARATUS, TASK INITIATION METHOD, AND COMPUTER READABLE MEDIUM

(71) Applicant: MITSUBISHI ELECTRIC CORPORATION, Tokyo (JP)

(72) Inventors: Chisato Sato, Tokyo (JP); Yoshiaki Katayama, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 116 days.

(21) Appl. No.: 16/466,180

(22) PCT Filed: Jan. 25, 2017

(86) PCT No.: PCT/JP2017/002498
§ 371 (c)(1),
(2) Date: Jun. 3, 2019

(87) PCT Pub. No.: WO2018/138798
PCT Pub. Date: Aug. 2, 2018

(65) Prior Publication Data
US 2020/0004581 A1 Jan. 2, 2020

(51) Int. Cl.
G06F 9/46 (2006.01)
G06F 9/48 (2006.01)

(52) U.S. Cl.
CPC .......... G06F 9/4837 (2013.01); G06F 9/4887 (2013.01)

(58) Field of Classification Search
CPC .... G06F 9/4837; G06F 9/4887; G06F 9/4825; G06F 9/4812; G06F 9/4806; G06F 13/24; G06F 13/26; G06F 13/32; G06F 13/34
See application file for complete search history.

(56) References Cited

U.S. PATENT DOCUMENTS 5,845,133 A * 12/1998 Funk .................. G06F 9/45533
710/268
6,038,632 A 3/2000 Yamazaki et al.
(Continued)

FOREIGN PATENT DOCUMENTS

JP 10-143378 A 5/1998
JP 11-73330 A 3/1999
(Continued)

OTHER PUBLICATIONS

Mitsubishi Electric, "Basic Software for W-CDMA Portable Devices," Mitsubishi Electric Technical Report, vol. 77, No. 2, Feb. 2003, pp. 44-47 (total 6 pages), with a partial English translation on p. 46.
(Continued)

Primary Examiner — Emerson C Puente
Assistant Examiner — Zhi Chen
(74) Attorney, Agent, or Firm — Birch, Stewart, Kolasch & Birch, LLP

(57) ABSTRACT

A computer apparatus (100) includes an OS execution unit (120), an OS-dependent interrupt processing unit (110), and an OS-independent interrupt processing unit (130). When an OS-independent interrupt (201) due to a state of a device (200) occurs, the OS-independent interrupt processing unit (130) determines whether or not to initiate a task (145). When the task (145) is to be initiated, the OS-independent interrupt processing unit (130) turns on the flag (141) and causes the OS execution unit (120) to generate an OS-dependent interrupt (202). When the OS-dependent interrupt (202) is generated, the OS-dependent interrupt processing unit (110) determines whether or not the flag (141) is on, and when the flag (141) is on, initiates the task (145) and turns off the flag (141).

4 Claims, 11 Drawing Sheets

(56) References Cited

U.S. PATENT DOCUMENTS

| | | | |
|---|---|---|---|
| 6,223,246 B1 | 4/2001 | Miyamoto | |
| 6,466,998 B1* | 10/2002 | Bennett | G06F 13/24 710/262 |
| 6,600,963 B1* | 7/2003 | Loise | G06F 11/008 700/21 |
| 6,792,492 B1 | 9/2004 | Griffin | |
| 2003/0221491 A1* | 12/2003 | Albert | G01L 9/125 73/724 |
| 2004/0088704 A1 | 5/2004 | Owen et al. | |
| 2005/0144347 A1* | 6/2005 | Kitamura | G06F 13/24 710/260 |
| 2005/0167513 A1 | 8/2005 | Ogawa et al. | |
| 2015/0143010 A1* | 5/2015 | Son | G06F 13/24 710/262 |

FOREIGN PATENT DOCUMENTS

| | | |
|---|---|---|
| JP | 11-184712 A | 7/1999 |
| JP | 2000-47880 A | 2/2000 |
| JP | 2001-92676 A | 4/2001 |
| JP | 2004-199393 A | 7/2004 |
| JP | 2005-222194 A | 8/2005 |
| JP | 2008-305351 A | 12/2008 |
| JP | 2009-261865 A | 10/2009 |
| JP | 2015-225474 A | 12/2015 |

OTHER PUBLICATIONS

Renesas, "M3T-MR30/4 V.4.01 Users Manual," Rev. 1.00, Jun. 2011, pp. 1-298 (total 315 pages), with a partial English translation on p. 30 (Section 3.6.1).

Simonović et al., "Power Management Implementation in FreeRTOS on LM3S3748," Serbian Journal of Electrical Engineering, vol. 10, No. 1, Feb. 2013, pp. 199-208.

* cited by examiner

Fig. 2

141: FLAG

| ELEMENT NUMBER | 0 | 1 | 2 | 3 | ... | n |
|---|---|---|---|---|---|---|
| FLAG VALUE | 0 or 1 | 0 or 1 | 0 or 1 | 0 or 1 | ... | 0 or 1 |

Fig. 3

| ELEMENT NUMBER / FLAG VALUE | 0 | 1 | 2 | 3 | ... | n |
|---|---|---|---|---|---|---|
| 0 | DEVICE 0 NOTIFICATION REQUEST NO | DEVICE 1 NOTIFICATION REQUEST NO | DEVICE 2 NOTIFICATION REQUEST NO | DEVICE 3 NOTIFICATION REQUEST NO | ... | DEVICE n NOTIFICATION REQUEST NO |
| 1 | DEVICE 0 NOTIFICATION REQUEST YES | DEVICE 1 NOTIFICATION REQUEST YES | DEVICE 2 NOTIFICATION REQUEST YES | DEVICE 3 NOTIFICATION REQUEST YES | ... | DEVICE n NOTIFICATION REQUEST YES |

COMPUTER APPARATUS, TASK INITIATION METHOD, AND COMPUTER READABLE MEDIUM

TECHNICAL FIELD

The present invention relates to a computer apparatus, a task initiation program, and a task initiation method.

BACKGROUND ART

Non-Patent Literature 1 discloses a computer system using a real-time operating system (OS) for embedded devices. The computer system of Non-Patent Literature 1 has two types of interrupt handlers: a kernel-managed interrupt handler which is dependent on the OS and a non-kernel-managed interrupt handler which is independent of the OS. The kernel-managed interrupt handler is also referred to as an OS-dependent interrupt handler. The non-kernel-managed interrupt handler is also referred to as an OS-independent interrupt handler.

The OS-dependent interrupt handler can issue an OS service call within the OS-dependent interrupt handler. However, an OS-dependent interrupt generated while the service call is being processed is delayed until the OS-dependent interrupt can be accepted.

The OS-independent interrupt handler cannot issue an OS service call within the OS-independent interrupt handler. However, an OS-independent interrupt generated while a service call is being processed can be accepted even in a section where OS-dependent interrupts cannot be accepted.

CITATION LIST

Patent Literature
  Patent Literature 1: JP 2001-092676 A
Non-Patent Literature
  Non-Patent Literature 1: M3T-MR30/4 V.4.01 Users Manual (3.6 Interrupts)
  Non-Patent Literature 2: Mitsubishi Electric Technical Report, February 2003, "Third-Generation Mobile Phone Technology" (Feature Article: Basic Software for W-CDMA Portable Devices)

SUMMARY OF INVENTION

Technical Problem

In small embedded devices such as household electric appliances and motor control, when a delay of an interrupt as a result of using an OS-dependent interrupt cannot be tolerated, it is necessary to use an OS-independent interrupt.

Accordingly, there is a technique in which an OS-independent interrupt handler initiates a process of a task managed by the OS via an OS-dependent interrupt handler. Specifically, as in Patent Literature 1, there is a technique in which an OS-dependent interrupt generated using a periodic timer interrupt is used to monitor the state of a flag to be updated when a task is to be initiated by an OS-independent interrupt, so as to initiate the task as necessary.

However, with the technique of Patent Literature 1, OS-dependent interrupts need to be generated regularly even when the flag is not set, that is, even when there is no need to initiate the task. Therefore, the utilization of a central processing unit (CPU) is wasted.

In addition, since OS-dependent interrupts must always be generated periodically, a tickless timer method disclosed in Non-Patent Literature 2 cannot be adopted, and the power consumption of a computer apparatus is wasted. The tickless timer method is a method in which system clock interrupts can be generated only when necessary.

It is an object of the present invention to adopt the tickless timer method as a time management method of the OS and to initiate a task managed by the OS from an OS-independent interrupt handler via a non-periodic OS-dependent interrupt handler.

Solution to Problem

A computer apparatus according to the present invention is connected with a device and includes an OS execution unit to execute an operating system (OS) and generate an OS-dependent interrupt, and the computer apparatus includes:
  a storage unit to store a flag;
  an OS-independent interrupt processing unit to, when an OS-independent interrupt due to a state of the device occurs, determine whether or not to initiate a task, and when the task is to be initiated, turn on the flag and cause the OS execution unit to generate the OS-dependent interrupt; and
  an OS-dependent interrupt processing unit to, when the OS-dependent interrupt is generated by the OS execution unit, determine whether or not the flag is on, and when the flag is on, initiate the task and turn off the flag.

Advantageous Effects of Invention

In a computer apparatus according to the present invention, when an OS-independent interrupt occurs, an OS-independent interrupt processing unit determines whether or not to initiate a task, and when the task is to be initiated, turns on the flag and causes an OS execution unit to generate an OS-dependent interrupt. When the OS-dependent interrupt is generated, an OS-dependent interrupt processing unit determines whether or not the flag is on, and when the flag is on, initiates the task and turns off the flag. Therefore, according to the computer apparatus of the present invention, it is possible to generate an OS-dependent interrupt irregularly upon occurrence of an OS-independent interrupt and to initiate a task by the OS-dependent interrupt processing unit. Hence, CPU utilization can be enhanced and power consumption can be reduced.

BRIEF DESCRIPTION OF DRAWINGS

FIG. 2 is an example configuration of an array of a flag 141 according to the first embodiment;

FIG. 3 is a diagram of correspondence between element numbers and flag values of the flag 141 according to the first embodiment;

DESCRIPTION OF EMBODIMENTS

Figure 1:
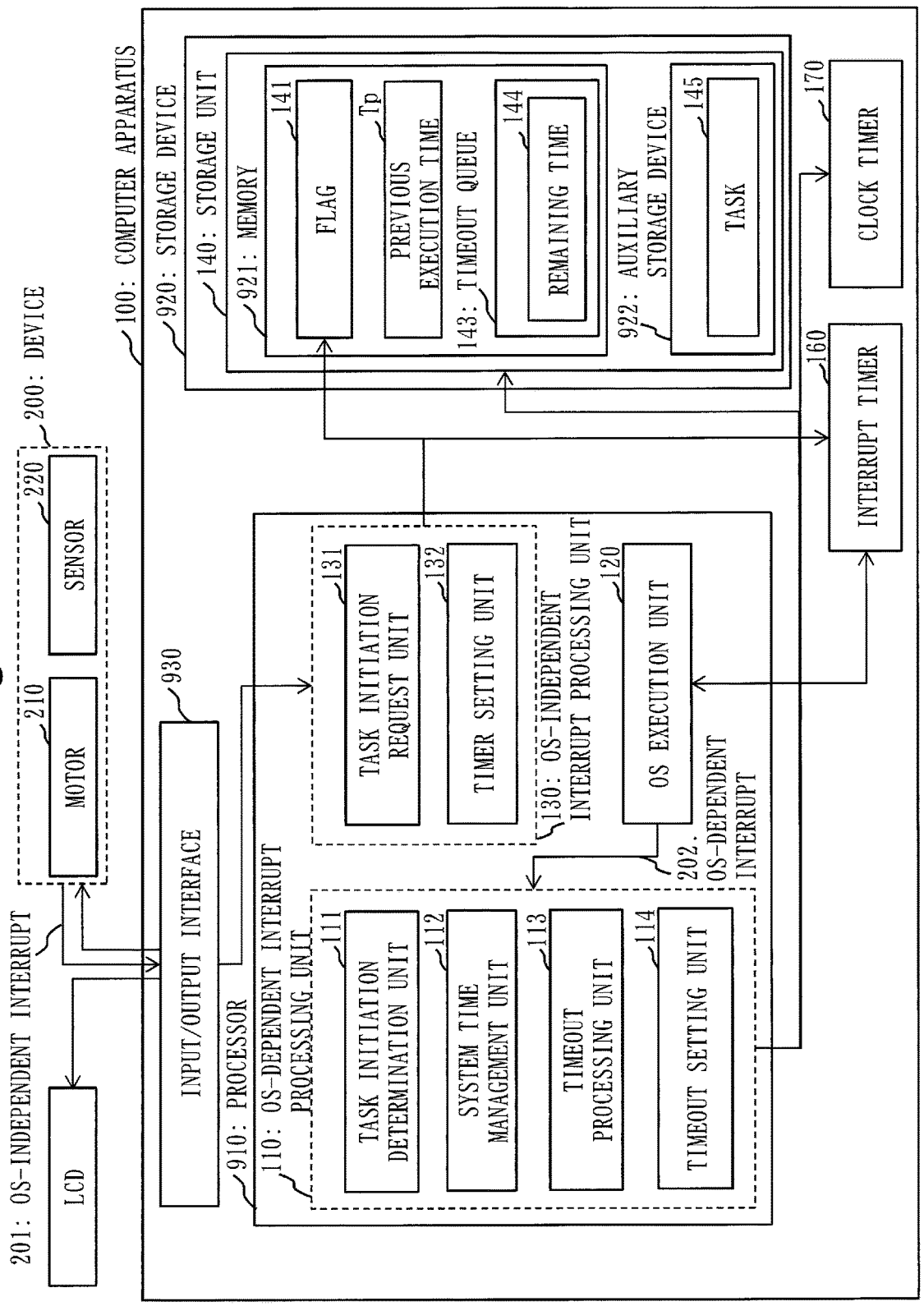
FIG. 1 is a configuration diagram of a computer apparatus 100 according to a first embodiment.

An embodiment of the present invention will be described hereinafter with reference to the drawings. Throughout the drawings, the same or corresponding parts are denoted by the same reference sings. In the description of the embodiment, description of the same or corresponding parts will be omitted or simplified as appropriate.

First Embodiment

Description of Configuration

A configuration of a computer apparatus 100 according to this embodiment will be described with reference to FIG. 1.

The computer apparatus 100 is connected with a device 200. The device 200 generates an OS-independent interrupt 201 due to a state of the device 200. Specifically, the device 200 is a motor 210 or a sensor 220. The device 200, such as the motor 210 or the sensor 220, generates an interrupt due to a state change including completion of an operation or an error as the OS-independent interrupt 201. Instead of having the device 200 generate the OS-independent interrupt 201, the computer apparatus 100 may use a timer to periodically generate OS-independent interrupts so as to monitor changes in the state of the device 200.

As illustrated in FIG. 1, the computer apparatus 100 is a computer.

The computer apparatus 100 includes hardware, such as a processor 910, a storage device 920, an input/output interface 930, an interrupt timer 160, and a clock timer 170. The storage device 920 includes a memory 921 and an auxiliary storage device 922.

The computer apparatus 100 includes, as functional components, an OS-dependent interrupt processing unit 110, an OS-independent interrupt processing unit 130, an OS execution unit 120, and a storage unit 140. The OS-dependent interrupt processing unit 110 includes a task initiation determination unit 111, a system time management unit 112, a timeout processing unit 113, and a timeout setting unit 114. The OS-independent interrupt processing unit 130 includes a task initiation request unit 131 and a timer setting unit 132.

The OS-dependent interrupt processing unit 110 is an OS-dependent interrupt handler. The OS-independent interrupt processing unit 130 is an OS-independent interrupt handler.

The task initiation determination unit 111, the system time management unit 112, the timeout processing unit 113, and the timeout setting unit 114 are called by the OS-dependent interrupt processing unit 110 which is the OS-dependent interrupt handler. The task initiation request unit 131 and the timer setting unit 132 are called by the OS-independent interrupt processing unit 130 which is the OS-independent interrupt handler.

The functions of the task initiation determination unit 111, the system time management unit 112, the timeout processing unit 113, the timeout setting unit 114, the task initiation request unit 131, the timer setting unit 132, and the OS execution unit 120 are realized by software.

The storage unit 140 is realized by the memory 921 and the auxiliary storage device 922. The storage unit 140 may also be realized solely by the memory 921 or solely by the auxiliary storage device 922. The storage unit 140 may be realized by any method. A flag 141, a previous execution time Tp, and a timeout queue 143 are stored in the memory 921. A remaining time 144 is set in the timeout queue 143. A task 145 is stored in the auxiliary storage device 922.

The processor 910 is connected with other hardware components with signal lines and controls these hardware components. The processor 910 is an integrated circuit (IC) that performs arithmetic processing. The processor 910 is a central processing unit (CPU) or a microprocessing unit (MPU).

Specifically, the auxiliary storage device 922 is a read only memory (ROM), a flash memory, or a hard disk drive (HDD). Specifically, the memory 921 is a random access memory (RAM).

The input/output interface 930 functions as an input interface and also functions as an output interface.

When functioning as the input interface, the input/output interface 930 is a port which is connected with an input device, such as a mouse, a keyboard, or a touch panel. Specifically, the input/output interface 930 is a Universal Serial Bus (USB) terminal. The input/output interface 930 may also be a port which is connected with a local area network (LAN). The input/output interface 930 is connected with the device 200 and accepts the OS-independent interrupt 201 from the device 200.

When functioning as the output interface, the input/output interface 930 is a port to which a cable of a display device, such as a display, is connected. Specifically, the output interface is a USB terminal or a High Definition Multimedia Interface (HDMI) (registered trademark) terminal. Specifically, the display is a liquid crystal display (LCD).

The auxiliary storage device 922 stores a program for realizing the functions of the task initiation determination unit 111, the system time management unit 112, the timeout processing unit 113, the timeout setting unit 114, the task initiation request unit 131, the timer setting unit 132, and the OS execution unit 120. The program for realizing the functions of the task initiation determination unit 111, the system time management unit 112, the timeout processing unit 113, the timeout setting unit 114, the task initiation request unit 131, the timer setting unit 132, and the OS execution unit 120 is also referred to as a task initiation program 520. This program is loaded into the memory 921, read by the processor 910, and executed by the processor 910. The auxiliary storage device 922 also stores an OS. At least part of the OS is loaded into the memory 921. Then, the processor 910 executes the task initiation program 520 while executing the OS. The task 145 is initiated by a service call that the OS provides using the interrupt timer 160.

The computer apparatus 100 may include only one processor 910, or may include a plurality of processors 910. The plurality of processors 910 may cooperate to execute the program for realizing the functions of the task initiation determination unit 111, the system time management unit 112, the timeout processing unit 113, the timeout setting unit 114, the task initiation request unit 131, the timer setting unit 132, and the OS execution unit 120.

Information, data, signal values, and variable values indicating results of processing by the task initiation determination unit 111, the system time management unit 112, the timeout processing unit 113, the timeout setting unit 114, the task initiation request unit 131, the timer setting unit 132, and the OS execution unit 120 are stored in the auxiliary storage device 922 and the memory 921 of the computer apparatus 100, or in a register or a cache memory in the processor 910.

The program for realizing the functions of the task initiation determination unit 111, the system time management unit 112, the timeout processing unit 113, the timeout setting unit 114, the task initiation request unit 131, the timer setting unit 132, and the OS execution unit 120 may be stored in a portable recording medium, such as a magnetic disk, a flexible disk, an optical disc, a compact disc, a Blu-ray (registered trademark) disc, and a digital versatile disc (DVD).

Note that a task initiation program product is a storage medium or a storage device in which the task initiation program 520 is recorded. The task initiation program product refers to an object into which a computer-readable program has been loaded, regardless of appearance.

Description of Functional Components

The functional components in FIG. 1 will now be described.

The OS execution unit 120 manages execution of the task 145 in the computer apparatus 100. The OS execution unit 120 also provides a function of initiating the task 145 in the computer apparatus 100.

The device 200 generates an OS-independent interrupt 201 due to a state change including completion of an operation or an error.

The interrupt timer 160 is used to cause the OS execution unit 120 to generate an OS-dependent interrupt 202. That is, the OS-dependent interrupt 202 is generated by the function of the interrupt timer 160. The interrupt timer 160 is also referred to as a system clock interrupt timer.

The clock timer 170 is a timer for keeping track of the system time. The clock timer 170 is also referred to as a system time clock timer. Specifically, the clock timer 170 is a timer using a free-running timer function.

When the OS-independent interrupt 201 due to the state of the device 200 occurs, the task initiation request unit 131 determines whether or not to initiate the task 145. When the task 145 is to be initiated, the task initiation request unit 131 turns on the flag 141 and causes the OS execution unit 120 to generate the OS-dependent interrupt 202. The task 145 is any task managed by the OS. Turning on the flag 141 means setting the flag, specifically, setting the value thereof to "1".

The flag 141 is configured with a data structure that allows determination of a corresponding device 200 when the flag 141 is set by the task initiation request unit 131. The data structure of the flag 141 also allows determination of a task 145 to be initiated when there are a plurality of tasks 145. There may be a plurality of flags 141. The flag 141 is also referred to as a notification request flag.

An example configuration of an array of the flag 141 according to this embodiment will be described with reference to FIG. 2. As illustrated in FIG. 2, an element number and a flag value are associated with each other in the flag 141. Note that an element number is associated with a device in advance. When task initiation is required for a device, the flag value of the element number corresponding to the device is set to "1".

FIG. 3 is a diagram illustrating correspondence between element numbers and flag values in the flag 141 according to this embodiment. As illustrated in FIG. 3, when the flag value corresponding to an element number is "0", this means that there is no notification request for the device associated with the element number. When the flag value corresponding to an element number is "1", this means that there is a notification request for the device associated with the element number.

The configuration of the flag 141 as described above allows the task initiation determination unit 111 to identify a device that the notification request concerns and to initiate an appropriate task.

The timer setting unit 132 causes the OS execution unit 120 to generate the OS-dependent interrupt 202 by setting a counter value in the interrupt timer 160. Specifically, the timer setting unit 132 sets a value that causes the counter value to become 0 immediately, such as 0 ms, 1 ms, or 0.5 ms, in the interrupt timer 160 as the counter value.

The OS execution unit 120 generates the OS-dependent interrupt 202 using the interrupt timer 160. Specifically, the OS execution unit 120 generates the OS-dependent interrupt 202 when the counter value of the interrupt timer 160 becomes 0.

When the OS-dependent interrupt 202 is generated by the OS execution unit 120, the task initiation determination unit 111 determines whether or not the flag 141 is on. If the flag 141 is on, the task initiation determination unit 111 initiates the task 145 and turns off the flag 141. Turning off the flag 141 means lowering the flag, specifically, setting the value thereof to "0". That is, based on the state of the flag 141, the task initiation determination unit 111 initiates the task 145 and turns off the flag 141. Specifically, "0" is set in the flag 141.

The system time management unit 112 calculates an elapsed time based on the current time which is the current system time obtained from the clock timer 170 and the previous execution time Tp which is the system time last obtained.

The timeout processing unit 113 performs a timeout process of a task or a timer event handler. The computer apparatus 100 includes the timeout queue 143 that manages the remaining time 144 of the task or the timer event handler. The timeout processing unit 113 resets the remaining time 144 of the timeout queue 143 based on the previous execution time Tp at which the task was last initiated and the current time. Specifically, the timer event handler is a handler such as a cyclic handler or an alarm handler in a real-time OS based on the µITRON specification.

The timeout setting unit 114 manages a timeout queue of a task or a timer event handler queue. In the following, the timeout queue 143 means the timeout queue of the task or the timer event handler queue. The timeout setting unit 114 calculates a next interrupt time to generate the OS-dependent interrupt 202, and sets a counter value in the interrupt timer 160 so as to generate the OS-dependent interrupt 202 at the next interrupt time.

Description of Operation

Figure 4:
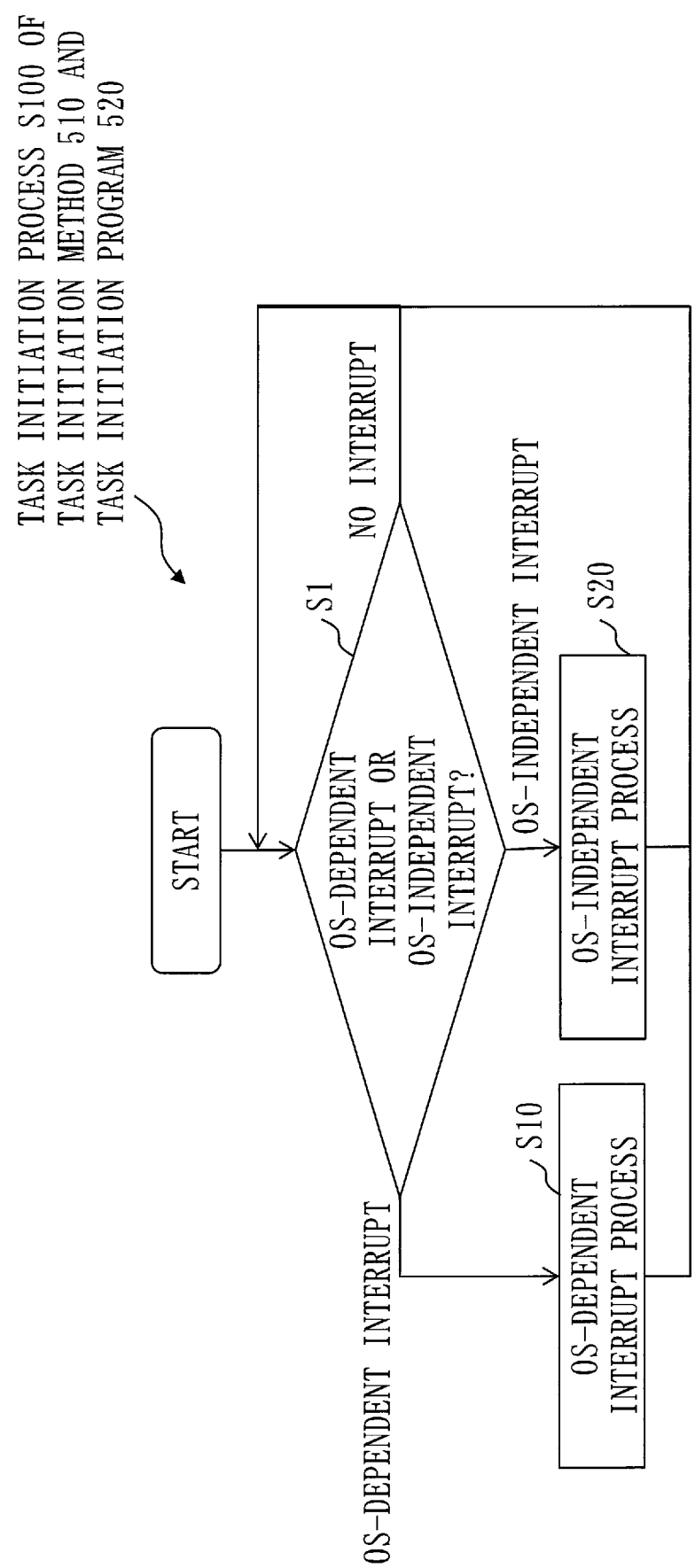
FIG. 4 is a flowchart illustrating a task initiation process S100 of a task initiation method 510 and a task initiation program 520 of the computer apparatus 100 according to the first embodiment.

FIG. 4 is a flowchart illustrating a task initiation process S100 of a task initiation method 510 and the task initiation program 520 of the computer apparatus 100 according to this embodiment. The task initiation program 520 causes the computer apparatus 100, which is a computer, to execute each process to be described below.

The task initiation process S100 includes an OS-dependent interrupt process S10 and an OS-independent interrupt process S20.

In step S1, if the OS-dependent interrupt 202 has occurred, the computer apparatus 100 proceeds to the OS-dependent interrupt process S10. If the OS-independent interrupt 201 has occurred, the computer apparatus 100 proceeds to the OS-independent interrupt process S20. If no interrupt has occurred, the computer apparatus 100 repeats step S1.

<OS-Dependent Interrupt Process S10>

Figure 5:
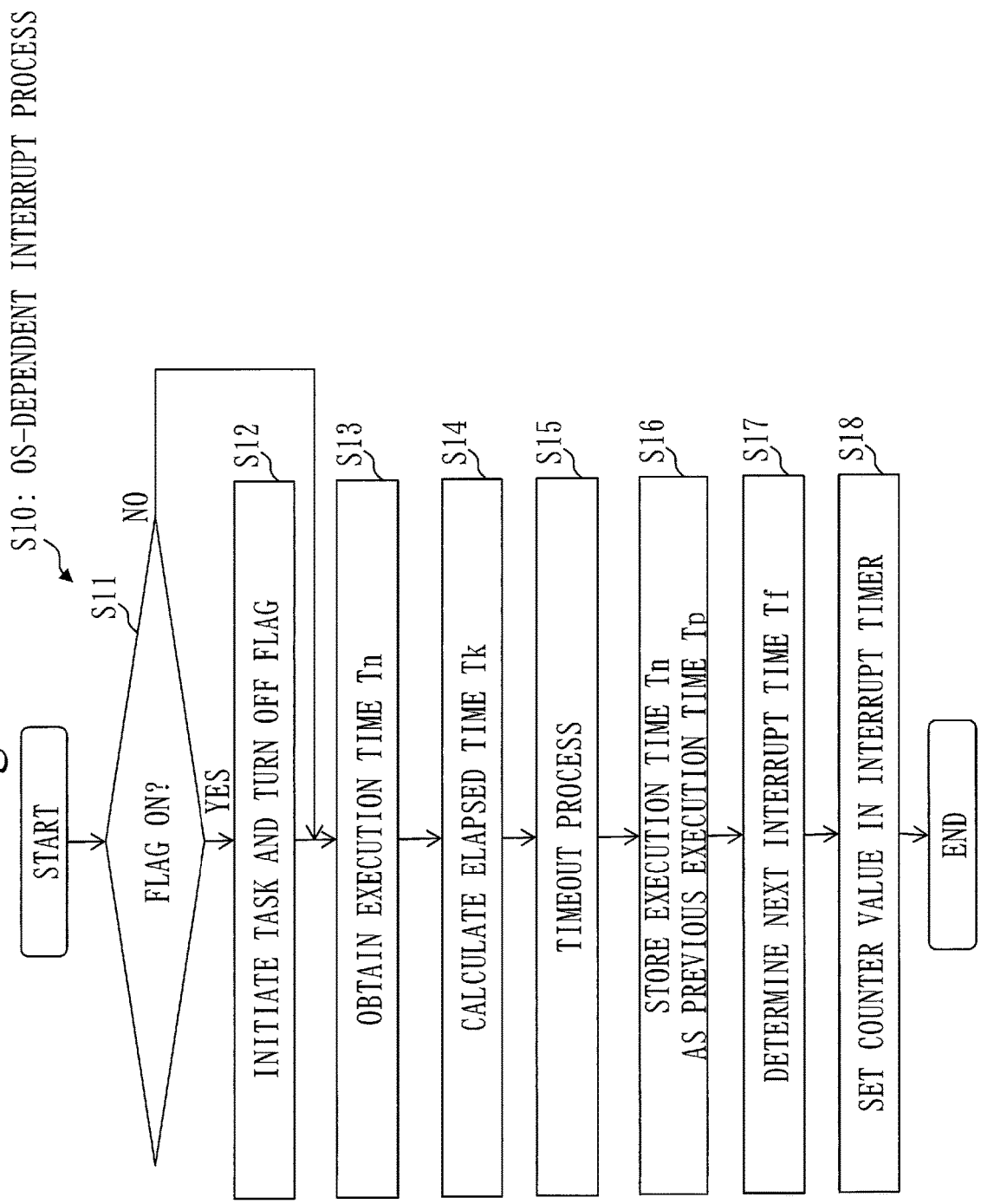
FIG. 5 is a flowchart illustrating an OS-dependent interrupt process S10 according to the first embodiment.

FIG. 5 is a flowchart illustrating the OS-dependent interrupt process S10 according to this embodiment.

The OS-dependent interrupt process S10 is started when the OS-dependent interrupt 202 is caused to occur by the interrupt timer 160 of the system clock. When the OS-dependent interrupt 202 is caused to occur by the interrupt timer 160, the OS-dependent interrupt handler is initiated by the interrupt function of the OS execution unit 120 of the processor 910. Then, the OS-dependent interrupt handler calls the task initiation determination unit 111.

In the OS-dependent interrupt process S10, when the OS-dependent interrupt 202 is generated by the OS execution unit 120, the OS-dependent interrupt processing unit 110 determines whether or not the flag 141 is on. If the flag 141 is on, the OS-dependent interrupt processing unit 110 initiates the task 145 and turns off the flag 141.

In step S11, the task initiation determination unit 111 determines whether or not the flag 141 is set. If the flag 141 is set, the process proceeds to step S12. If the flag 141 is off, the process proceeds to step S13.

In step S12, the task initiation determination unit 111 initiates the task 145 to be executed using a service call provided by the OS, and turns off the flag 141. The process proceeds to step S13 which is executed by the system time management unit 112.

Next, in step S13, the system time management unit 112 obtains the current system time as an execution time Tn from the clock timer 170 of the system time.

In step S14, the system time management unit 112 obtains the previous execution time Tp previously stored in the storage unit 140 when the previous interrupt occurred. The system time management unit 112 compares the previous execution time Tp with the execution time Tn, and calculates an elapsed time Tk from the previous execution time Tp to the execution time Tn. The previous execution time Tp has an initial value of 0. The process proceeds to step S15 which is executed by the timeout processing unit 113.

In step S15, the timeout processing unit 113 performs the timeout process of the task or the alarm handler based on the elapsed time Tk calculated by the system time management unit 112. A specific example of the timeout process will be described later. The process proceeds to step S16 which is executed by the timeout setting unit 114.

In step S16, the timeout setting unit 114 stores the execution time Tn obtained by the system time management unit 112 in the storage unit 140 as the previous execution time Tp.

Then, in step S17, the timeout setting unit 114 checks the remaining time 144 set in the head element of each timeout queue 143, and determines a next interrupt time Tf based on the smallest remaining time 144.

Finally, in step S18, the timeout setting unit 114 sets the counter value of the interrupt timer 160 so that an interrupt of the interrupt timer 160 of the system clock occurs at the next interrupt time Tf.

This concludes the OS-dependent interrupt process S10.

<OS-Independent Interrupt Process S20>

Figure 6:
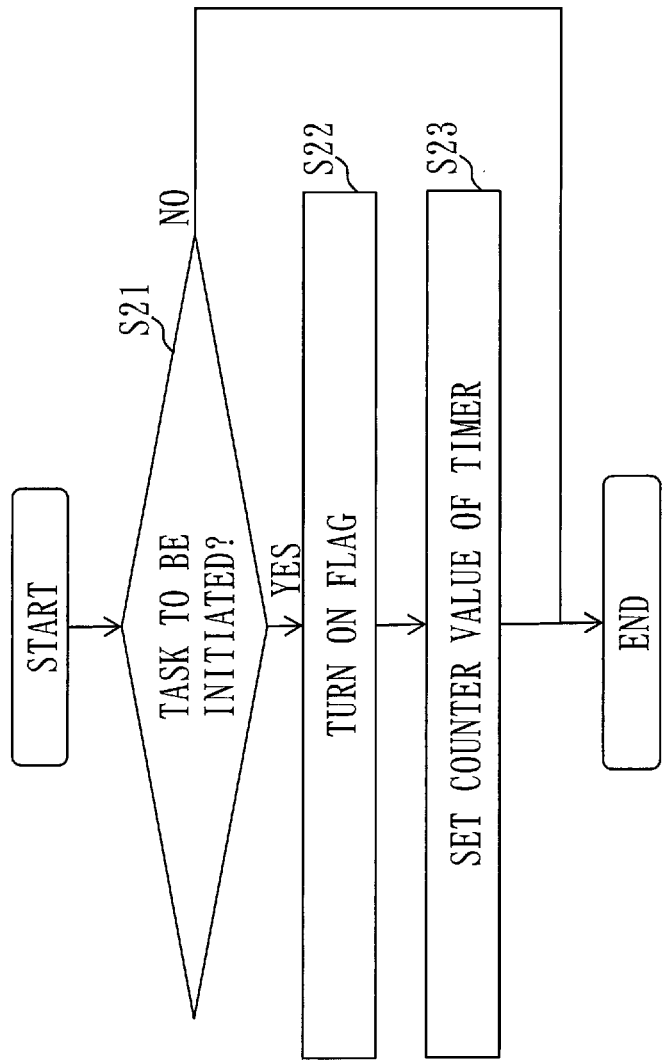
FIG. 6 is a flowchart illustrating an OS-independent interrupt process S20 according to the first embodiment.

FIG. 6 is a flowchart illustrating the OS-independent interrupt process S20 according to this embodiment.

In a task initiation request process S21, when the OS-independent interrupt 201 occurs from the device 200, the OS-independent interrupt handler is initiated. Then, the OS-independent interrupt handler calls the task initiation request unit 131.

In the OS-independent interrupt process S20, when the OS-independent interrupt 201 due to the state of the device 200 occurs, the OS-independent interrupt processing unit 130 determines whether or not to initiate the task 145. If the task 145 is to be initiated, the OS-independent interrupt processing unit 130 turns on the flag 141, and causes the OS execution unit 120 to generate the OS-dependent interrupt 202.

In step S21, the task initiation request unit 131 determines whether or not the task 145 needs to be initiated. The task initiation request unit 131 may determine whether or not the task 145 needs to be initiated based on any condition. If the task 145 needs to be initiated, the process proceeds to step S22. If the task 145 does not need to be initiated, the process terminates.

In step S22, the task initiation request unit 131 sets the flag 141. The process proceeds to step S23 which is executed by the timer setting unit 132.

In step S23, the timer setting unit 132 overwrites the counter value of the interrupt timer 160 so that the OS-dependent interrupt 202 occurs immediately. Specifically, the timer setting unit 132 sets the interrupt timer 160 to a counter value, such as 0 ms, 1 ms, or 2 ms, so that the OS-dependent interrupt 202 occurs immediately.

This concludes the OS-independent interrupt process S20.

Note that the counter value of the interrupt timer 160 set by the timer setting unit 132 may be dynamically determined in accordance with any condition. Specifically, if the elapsed time since the time when the counter value was last overwritten is short, the timer setting unit 132 may intentionally set a large counter value. Alternatively, the timer setting unit 132 may omit to perform overwriting of the counter value. Such setting of the counter value may be provided as part of the function of the timer setting unit 132. Alternatively, a processing unit for determining whether or not to decide a counter value may perform setting of the counter value. Alternatively, a processing unit for determining whether or not to rewrite the counter value may perform setting of the counter value.

In this embodiment, the task initiation determination unit 111 determines whether or not a task needs to be initiated in the process of an OS-dependent interrupt that occurs in connection with a timer interrupt. However, the task initiation determination unit 111 may determine whether or not a task needs to be initiated in the process of an interrupt that occurs due to a different factor.

A specific example of the OS-dependent interrupt process S10 by the computer apparatus 100 according to this embodiment will now be described with reference to FIG. 7 to FIG. 10.

Figure 7:
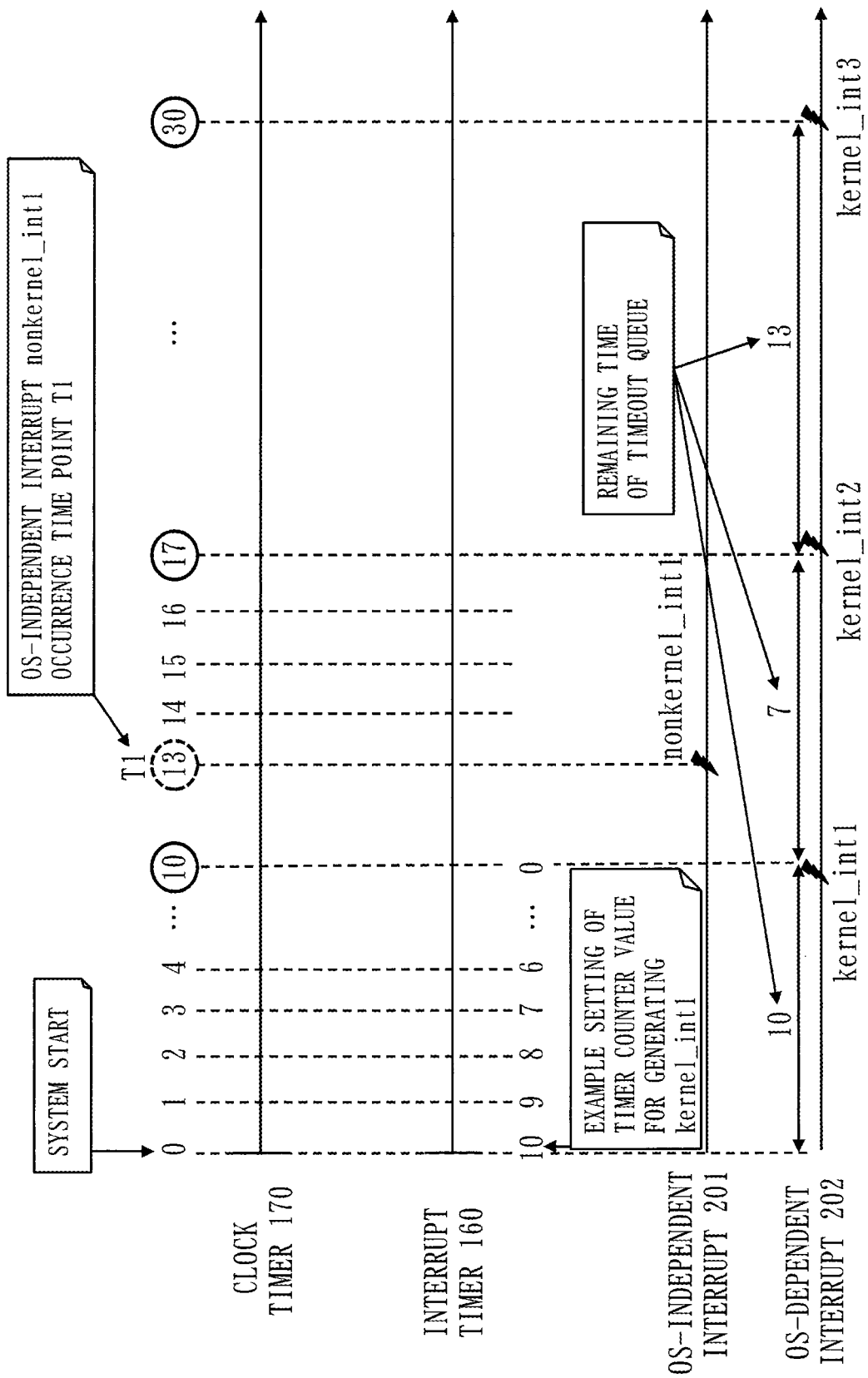
FIG. 7 is a diagram illustrating interrupt occurrence timing which is assumed in a specific example of the OS-dependent interrupt process S10 according to the first embodiment.

FIG. 7 illustrates interrupt occurrence timing which is assumed in this specific example. It is illustrated that a period of 10 ms is set in the interrupt timer 160, and the OS-independent interrupt 201 occurs at a time point T1 which is 3 ms after the start point of the period. In FIG. 7 to FIG. 10, the OS-dependent interrupt 202 is denoted as kernel_int and the OS-independent interrupt 201 is denoted as nonkernel_int.

Figure 8:
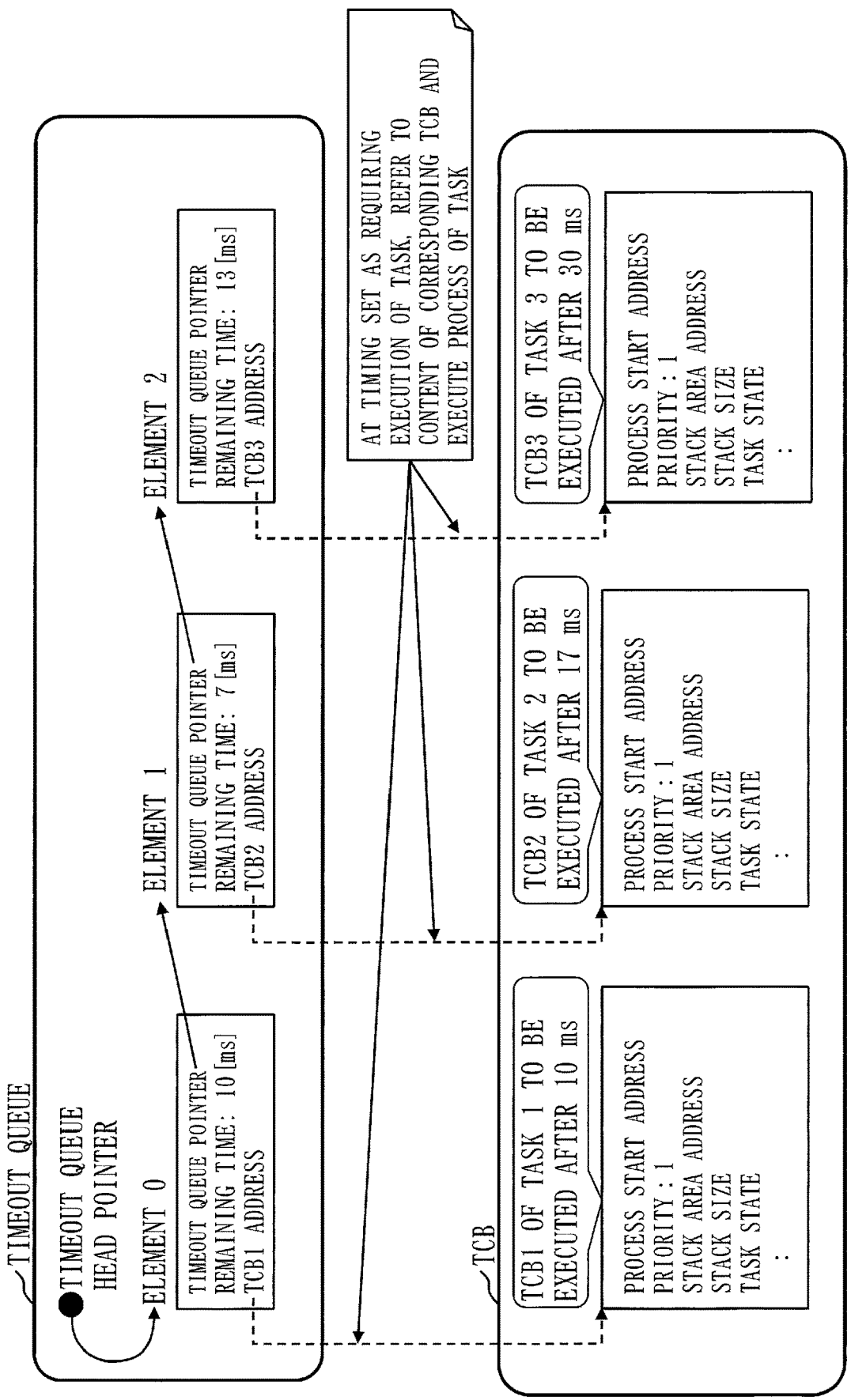
FIG. 8 is a diagram illustrating a timeout queue and task management information which correspond to FIG. 7.

FIG. 8 illustrates a timeout queue and task management information. The task management information is denoted as TCB (Task Control Block). The timeout queue is information in which TCBs are concatenated in order of timeout. Based on the remaining time of the timeout queue, the OS refers to the content of a corresponding TCB at the timing set as requiring execution of the task so as to execute the process of the task.

Figure 9:
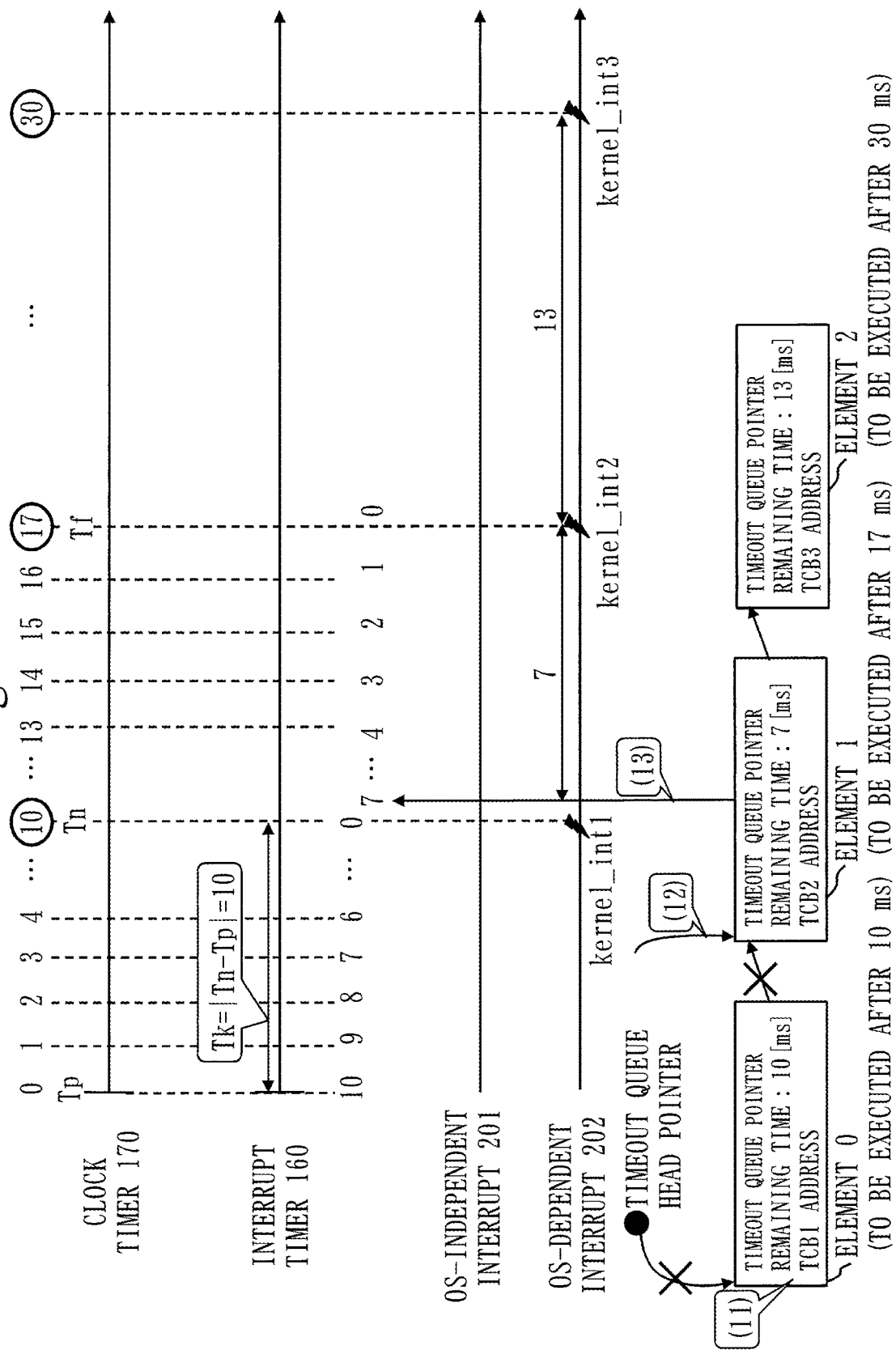
FIG. 9 is a diagram illustrating a specific example of the OS-dependent interrupt process in the case in which only an OS-dependent interrupt occurs.

FIG. 9 is a diagram illustrating a specific example of the OS-dependent interrupt process in the case in which only an OS-dependent interrupt occurs. A specific example of the process from step S15 to step S18 in FIG. 5 in the case in which only an OS-dependent interrupt occurs will be described with reference to FIG. 9. In the following, (11) to (13) correspond to (11) to (13) illustrated in FIG. 9.

In step S15, the timeout processing unit 113 checks whether or not there is a task whose execution time has passed. If there is a task whose execution time has passed, the timeout processing unit 113 causes the OS to execute the process of this task. If there is a task for which the remaining time—the elapsed time≤0, the timeout processing unit 113 causes the OS to execute the process of this task. As illustrated in (11) of FIG. 9, the remaining time at the head of the timeout queue is 10 ms and the elapsed time Tk is 10 ms, so that 10−10=0. Therefore, the timeout processing unit 113 causes the OS to execute the process of task 1. Then, the timeout processing unit 113 updates the address pointed to by the head pointer of the timeout queue to the next element. As illustrated in (12) of FIG. 9, the timeout processing unit 113 changes the address pointed to by the head pointer of the timeout queue from the address of element 0 to the address of element 1.

In step S16, the timeout processing unit 113 stores the execution time Tn in the storage unit 140 as the previous execution time Tp.

In step S17, the timeout processing unit 113 determines the next interrupt time Tf. There may be a plurality of timeout queues including a timeout queue for a timer event handler and a timeout queue for an alarm handler. Therefore, the timeout processing unit 113 compares the remaining times of the head blocks of all the timeout queues so as to determine the next interrupt time Tf.

In step S18, the timeout processing unit 113 sets a counter value in the interrupt timer 160. The counter value of the interrupt timer 160 is set so that an OS-dependent interrupt occurs at the next interrupt time Tf. As illustrated in (13) of FIG. 9, the timeout processing unit 113 sets 7 ms in the interrupt timer 160.

Figure 10:
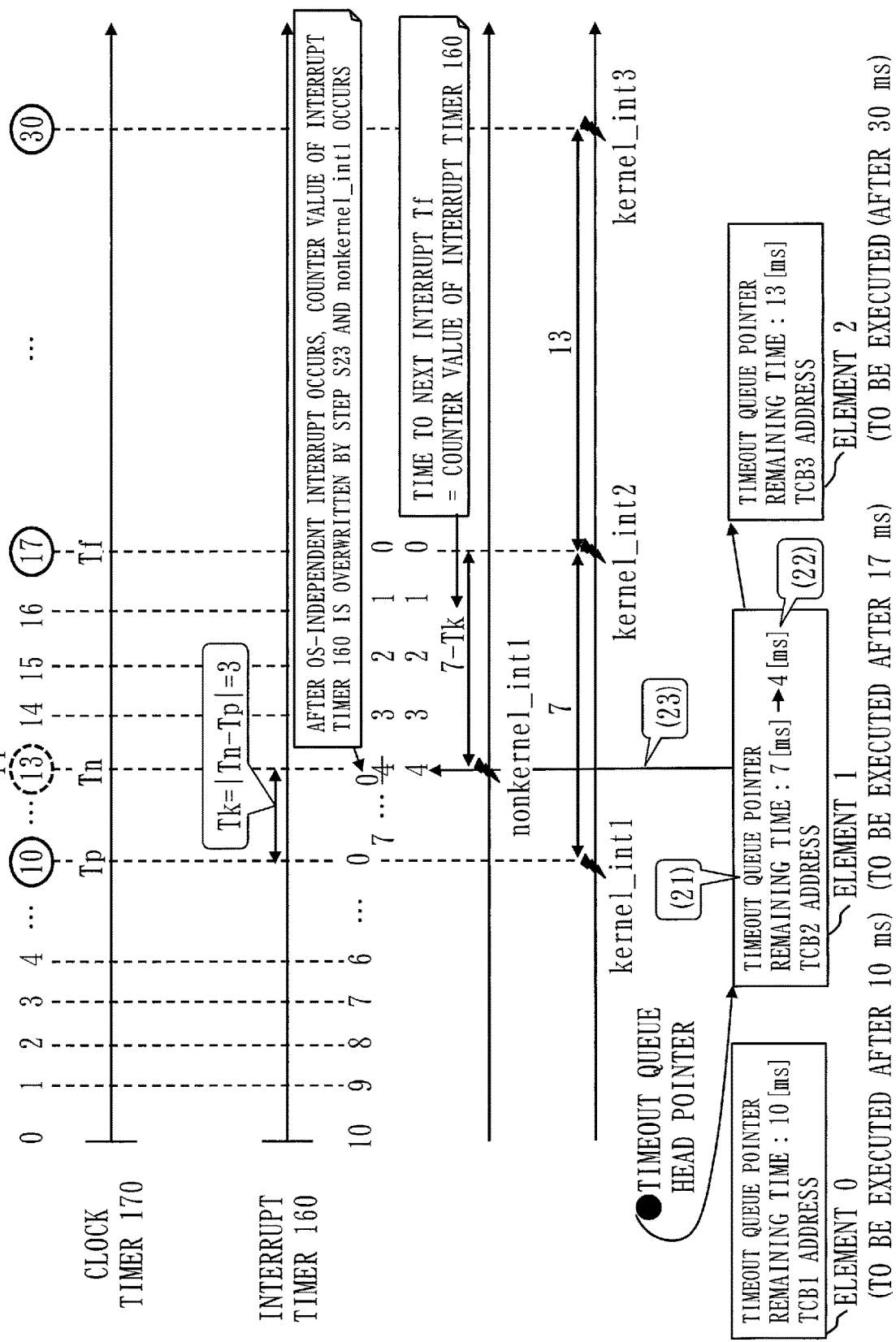
FIG. 10 is a diagram illustrating a specific example of the OS-dependent interrupt process in the case in which an OS-independent interrupt occurs at a time point T1 which is 3 ms after the start point of a period following the process in FIG. 9.

FIG. 10 is a diagram illustrating a specific example of the OS-dependent interrupt process in the case in which an OS-independent interrupt occurs at a time point T1 which is 3 ms after the start point of the period following the process in FIG. 9.

A specific example of the process from step S15 to step S18 in FIG. 5 in the case in which an OS-independent interrupt occurs at the time point T1 will be described with reference to FIG. 10. In the following, (21) to (23) correspond to (21) to (23) in FIG. 10. In the case of FIG. 10, the elapsed time Tk from the start point of the period is 3 ms.

In step S15, the timeout processing unit 113 checks whether or not there is a task whose execution time has passed. If there is a task whose execution time has passed, the timeout processing unit 113 causes the OS to execute the process of this task. If there is a task for which (the remaining time—the elapsed time)≤0, the timeout processing unit 113 causes the OS to execute the process of this task. As illustrated in (21) of FIG. 10, the remaining time at the head of the timeout queue is 7 ms and the elapsed time Tk is 3 ms, so that 7−3=4. Therefore, there is no task for the timeout processing unit 113 to execute. The timeout processing unit 113 updates the remaining time of the timeout queue. As illustrated in (22) of FIG. 10, Tk=3 ms has elapsed since the previous execution time Tp, so that the remaining time is updated from 7 ms to (7−3)=4 ms.

In step S16, the timeout processing unit 113 stores the execution time Tn in the storage unit 140 as the previous execution time Tp.

In step S17, the timeout processing unit 113 determines the next interrupt time Tf.

In step S18, the timeout processing unit 113 sets a counter value in the interrupt timer 160. The counter value is set in the interrupt timer 160 so that an OS-dependent interrupt occurs at the next interrupt time Tf. As illustrated in (23) of FIG. 10, the timeout processing unit 113 sets 4 ms in the interrupt timer 160.

This concludes the description of the specific example of the OS-dependent interrupt process S10 by the computer apparatus 100 according to this embodiment.

Other Configurations

The computer apparatus 100 may include a communication device. The communication device includes a receiver and a transmitter. Specifically, the communication device is a communication chip or a network interface card (NIC). The communication device functions as a communication unit that communicates data. The receiver functions as a receiving unit that receives data, and the transmitter functions as a transmitting unit that transmits data.

In this embodiment, the functions of the task initiation determination unit 111, the system time management unit 112, the timeout processing unit 113, the timeout setting unit 114, the task initiation request unit 131, the timer setting unit 132, and the OS execution unit 120 are realized by software. However, as a modification example, the functions of the task initiation determination unit 111, the system time management unit 112, the timeout processing unit 113, the timeout setting unit 114, the task initiation request unit 131, the timer setting unit 132, and the OS execution unit 120 may be realized by hardware.

A configuration of a computer apparatus 100 according to the modification example of this embodiment will be described with reference to FIG. 11.

Figure 11:
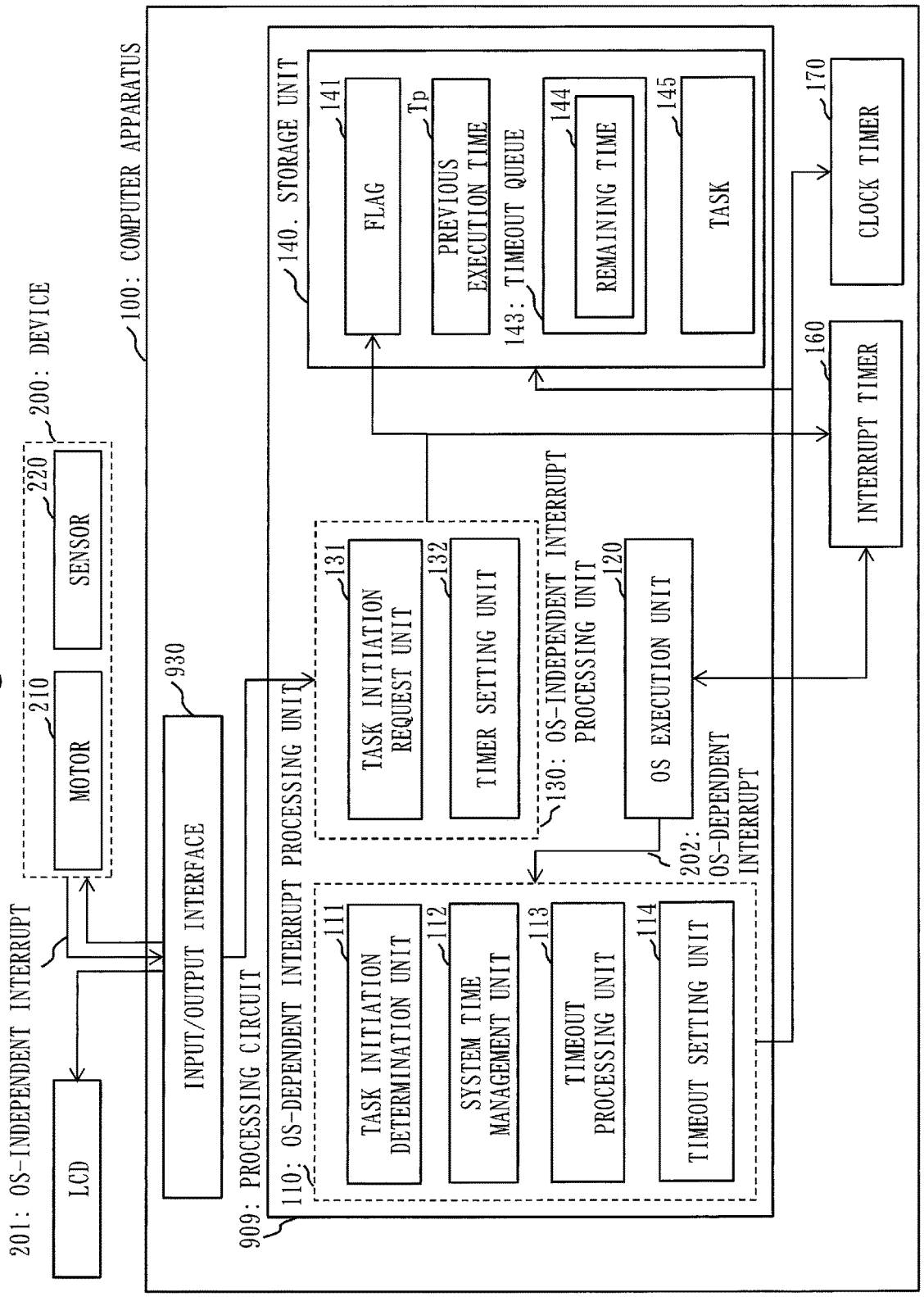
FIG. 11 is a configuration diagram of a computer apparatus 100 according to a modification example of the first embodiment.

As illustrated in FIG. 11, the computer apparatus 100 includes hardware, such as a processing circuit 909, an input/output interface 930, an interrupt timer 160, and a clock timer 170.

The processing circuit 909 is a dedicated electronic circuit that realizes the storage unit 140 and the functions of the task initiation determination unit 111, the system time management unit 112, the timeout processing unit 113, the timeout setting unit 114, the task initiation request unit 131, the timer setting unit 132, and the OS execution unit 120 described above. Specifically, the processing circuit 909 is a single circuit, a composite circuit, a programmed processor, a parallel programmed processor, a logic IC, a GA, an ASIC, or an FPGA. GA is an abbreviation for Gate Array. ASIC is an abbreviation for Application Specific Integrated Circuit. FPGA is an abbreviation for Field-Programmable Gate Array.

The functions of the task initiation determination unit 111, the system time management unit 112, the timeout processing unit 113, the timeout setting unit 114, the task initiation request unit 131, the timer setting unit 132, and the OS execution unit 120 may be realized by a single processing circuit 909, or may be realized by being distributed among a plurality of processing circuits 909.

As another modification example, the functions of the computer apparatus 100 may be realized by a combination of software and hardware. That is, one or more of the functions of the computer apparatus 100 may be realized by dedicated hardware, and the rest of the functions may be realized by software.

The processor 910, the storage device 920, and the processing circuit 909 of the computer apparatus 100 are collectively referred to as "processing circuitry". That is, regardless of whether the configuration of the computer apparatus 100 is the configuration illustrated in FIG. 1 or FIG. 11, the storage unit 140 and the functions of the task initiation determination unit 111, the system time management unit 112, the timeout processing unit 113, the timeout setting unit 114, the task initiation request unit 131, the timer setting unit 132, and the OS execution unit 120 are realized by the processing circuitry.

A "unit" may be replaced with a "step", "procedure" or "process". The function of a "unit" may be realized by firmware.

Description of Effects of This Embodiment

According to the computer apparatus 100 of this embodiment, a flag is set and an OS-dependent interrupt is generated. Therefore, it is possible to initiate a task at any time without monitoring the flag with a periodic OS-dependent interrupt. Hence, according to the computer apparatus 100 of this embodiment, it is possible to adopt the tickless timer method as the time management method of the OS and to reduce CPU utilization and power consumption. Furthermore, according to the computer apparatus 100 of this embodiment, there is no need to check the flag periodically, so that it is possible to respond to a notification request in the shortest time that can be set with the interrupt timer.

According to the computer apparatus 100 of this embodiment, an OS-dependent interrupt can be generated and a task can be initiated earlier than the time set by the timeout setting unit.

According to the computer apparatus 100 of this embodiment, the system time management unit that manages the system time is provided. Therefore, according to the computer apparatus 100 of this embodiment, even when the counter value of the interrupt timer is overwritten by the timer setting unit, it is possible to have the task and the alarm handler operate at the correct time. Furthermore, the computer apparatus 100 of this embodiment includes the timeout setting unit that manages the timeout queue of the task and the event handler queue and sets the counter value of the interrupt timer. Therefore, according to the computer apparatus 100 of this embodiment, even when the counter value of the interrupt timer is overwritten by the timer setting unit, it is possible to have an OS-dependent interrupt operate at the correct time.

In this embodiment, the task initiation determination unit 111, the system time management unit 112, the timeout processing unit 113, the timeout setting unit 114, the task initiation request unit 131, the timer setting unit 132, and the OS execution unit 120 constitute the computer apparatus 100 as independent functional blocks. However, it is not necessary to have the configuration as in the above-described embodiment, and the computer apparatus 100 may have any configuration. The functional blocks of the computer apparatus 100 may be any functional blocks as long as the functions described in the above embodiment can be realized. The computer apparatus may be constituted by any other combination of these functional blocks. The computer apparatus may also be constituted by any block configurations of these functional blocks.

The computer apparatus may be a single apparatus or may be a computer system constituted by a plurality of apparatuses.

The first embodiment has been described. A plurality of portions of this embodiment may be implemented in combination. Alternatively, one portion of this embodiment may be implemented. Alternatively, a plurality of portions of this embodiment may be implemented as a whole or partially in any combination.

The above-described embodiment is an essentially preferred example, and is not intended to limit the scope of the present invention and the scopes of applications and intended uses of the present invention, and various modifications are possible as necessary.

REFERENCE SIGNS LIST

100: computer apparatus, 110: OS-dependent interrupt processing unit, 130: OS-independent interrupt processing unit, 120: OS execution unit, 140: storage unit, 111: task initiation determination unit, 112: system time management unit, 113: timeout processing unit, 114: timeout setting unit, 131: task initiation request unit, 132: timer setting unit, 141: flag, 143: timeout queue, 144: remaining time, 145: task, 160: interrupt timer, 170: clock timer, 200: device, 210: motor, 220: sensor, 201: OS-independent interrupt, 202: OS-dependent interrupt, 510: task initiation method, 520: task initiation program, S10: OS-dependent interrupt process, S20: OS-independent interrupt process, S100: task initiation process, Tp: previous execution time, Tn: execution time, Tf: next interrupt time, Tk: elapsed time, 909: processing circuit, 910: processor, 920: storage device, 921: memory, 922: auxiliary storage device, 930: input/output interface

The invention claimed is:

1. A computer apparatus to be connected with a device, the computer apparatus comprising:
   processing circuitry to:
   execute an operating system (OS) and generate an OS-dependent interrupt for initiating an OS-dependent task for which a remaining time is set in a timeout queue, the remaining time being a time until a next interrupt time at which a next OS-dependent task is to be initiated and being set as a counter value of an interrupt timer;
   store a flag;
   determine, when an OS-independent interrupt due to a state of the device occurs, whether or not to initiate an OS-independent task corresponding to the device, and when the OS-independent task is to be initiated, turn on the flag and generate the OS-dependent interrupt by overwriting the counter value of the interrupt timer;
   determine, when the OS-dependent interrupt is generated, whether or not the flag is on, and when the flag is on, initiate the OS-independent task and turn off the flag; and
   obtain, when the OS-independent task is initiated, a previous execution time which is a time at which a previous OS-dependent task has been initiated and a current time, calculate an elapsed time from the previous execution time to the current time, and based on the elapsed time and the remaining time of a head task to be executed first among OS-dependent tasks, reset the counter value of the interrupt timer such that the head task is executed at the next interrupt time.

2. The computer apparatus according to claim 1, wherein when a value obtained by subtracting the elapsed time from the remaining time is greater than 0, the processing circuitry resets the counter value of the interrupt timer to the value obtained by subtracting the elapsed time from the remaining time, and when the value obtained by subtracting the elapsed time from the remaining time is equal to or less than 0, the processing circuitry resets the counter value of the interrupt timer such that the head task is executed immediately.

3. A task initiation method of a computer apparatus to be connected to a device and including processing circuitry to execute an operating system (OS) and generate an OS-dependent interrupt for initiating an OS-dependent task for which a remaining time is set in a timeout queue, the remaining time being a time until a next interrupt time at which a next OS-dependent task is to be initiated and being set as a counter value of an interrupt timer, the task initiation method comprising:

determining, when an OS-independent interrupt due to a state of the device occurs, whether or not to initiate an OS-independent task corresponding to the device, and when the OS-independent task is to be initiated, turning on a flag and causing the processing circuitry to generate the OS-dependent interrupt by overwriting the counter value of the interrupt timer;

determining, when the OS-dependent interrupt is generated by the processing circuitry, whether or not the flag is on, and when the flag is on, initiating the OS-independent task and turning off the flag, and obtaining, when the OS-independent task is initiated, a previous execution time which is a time at which a previous OS-dependent task has been initiated and a current time, calculating an elapsed time from the previous execution time to the current time, and based on the elapsed time and the remaining time of a head task to be executed first among OS-dependent tasks, resetting the counter value of the interrupt timer such that the head task is executed at the next interrupt time.

4. A non-transitory computer readable medium storing a task initiation program for a computer apparatus to be connected to a device and including processing circuitry to execute an operating system (OS) and generate an OS-dependent interrupt for initiating an OS-dependent task for which a remaining time is set in a timeout queue, the remaining time being a time until a next interrupt time at which a next OS-dependent task is to be initiated and being set as a counter value of an interrupt timer, the task initiation program causing the computer apparatus, which is a computer, to execute:

an OS-independent interrupt process to, when an OS-independent interrupt due to a state of the device occurs, determine whether or not to initiate an OS-independent task corresponding to the device, and when the OS-independent task is to be initiated, turn on a flag and cause the processing circuitry to generate the OS-dependent interrupt by overwriting the counter value of the interrupt timer;

an OS-dependent interrupt process to, when the OS-dependent interrupt is generated by the processing circuitry, determine whether or not the flag is on, and when the flag is on, initiate the OS-independent task and turn off the flag; and a process to, when the OS-independent task is initiated, obtain a previous execution time which is a time at which a previous OS-dependent task has been initiated and a current time, calculate an elapsed time from the previous execution time to the current time, and based on the elapsed time and the remaining time of a head task to be executed first among OS-dependent tasks, reset the counter value of the interrupt timer such that the head task is executed at the next interrupt time.

* * * * *